Dec. 3, 1957  P. KOLLSMAN  2,815,320
METHOD OF AND APPARATUS FOR TREATING
IONIC FLUIDS BY DIALYSIS
Filed Oct. 23, 1953  3 Sheets-Sheet 1

INVENTOR.
Paul Kollsman
BY
Howard G. Russell
his ATTORNEY

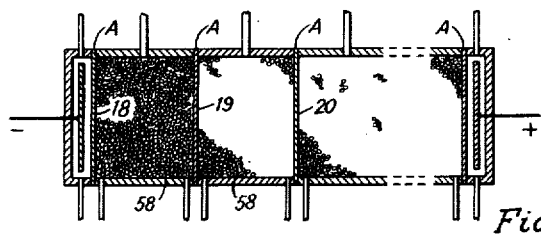

A. FILLER: Anionic, Amphoteric, Cationic,—but not predominating over membranes.
DRIVE: Anionic
B. FILLER: Cationic—predominating over membranes
DRIVE: Cationic (leakage operation)

Fig. 5

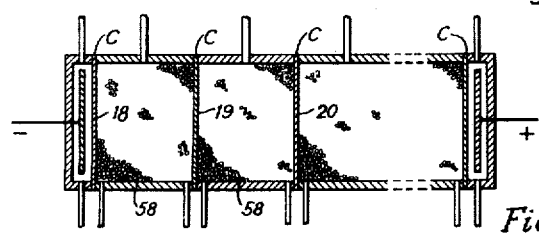

A. FILLER: Cationic, Amphoteric, Anionic,—but not predominating over membranes.
DRIVE: Cationic
D. FILLER: Anionic—predominating over membranes
DRIVE: Anionic (leakage operation)

Fig. 6

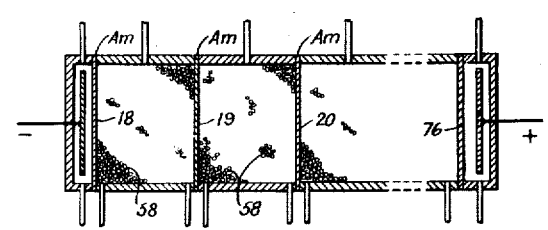

FILLER: Anionic
DRIVE: Anionic

FILLER: Cationic
DRIVE: Cationic

FILLER: Amphoteric
DRIVE: Anionic or Cationic depending on bias 76

Fig. 7

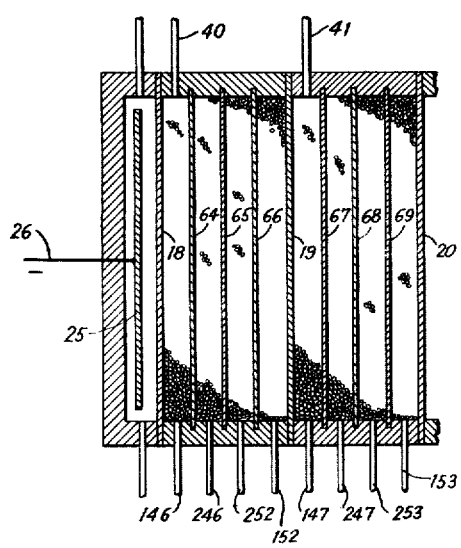

Fig. 4

INVENTOR.
Paul Kollsman
BY
Howard G. Russell
his ATTORNEY

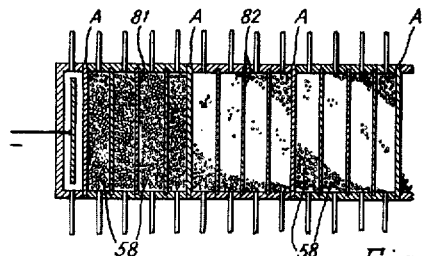

A. FILLER: Anionic, Amphoteric, Cationic*
   DRIVE: Anionic
   SUBDIVIDING MEMBRANES: Anionic, Amphoteric, Neutral, Cationic*
   *Filler and/or subdividing membranes not to predominate over anion membranes
B. *Filler and/or subdividing membranes predominating over anion membranes
   DRIVE: Cationic

Fig. 8

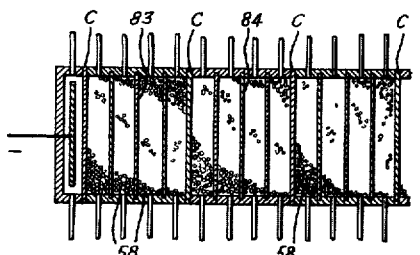

A. FILLER: Cationic, Amphoteric, Anionic*
   DRIVE: Cationic
   SUBDIVIDING MEMBRANES: Cationic, Amphoteric, Neutral, Anionic*
   *Filler and/or subdividing membranes not to predominate over cation membranes
B. *Filler and/or subdividing membranes predominating over cation membranes
   DRIVE: Anionic

Fig. 9

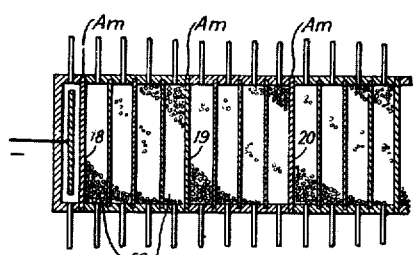

FILLER: Anionic, Amphoteric, Cationic
SUBDIVIDING MEMBRANES: Anionic, Amphoteric, Neutral, or Cationic
Filler and subdividing membranes together predominently anionic: Drive anionic
Filler and subdividing membranes together predominently cationic: Drive cationic

Fig. 10

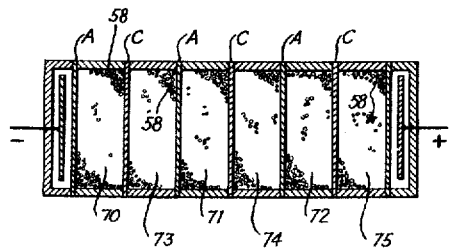

A. Anion and cation membranes of substantially equal selectivity: Simultaneous anion and cation drive by leakage through membranes of opposite polarity: Filler amphoteric
B. FILLER: Anionic  DRIVE: Anionic
C. FILLER: Cationic  DRIVE: Cationic

Fig. 11

INVENTOR.
Paul Kollsman
BY Howard G. Russell
his ATTORNEY

United States Patent Office 2,815,320
Patented Dec. 3, 1957

2,815,320

METHOD OF AND APPARATUS FOR TREATING IONIC FLUIDS BY DIALYSIS

Paul Kollsman, New York, N. Y.

Application October 23, 1953, Serial No. 387,986

39 Claims. (Cl. 204—180)

This invention relates to apparatus for treating mixtures and compounds in liquid or gaseous form by dialysis under the influence of an electric current. Such liquids or gaseous mixtures and compounds are hereinafter collectively referred to as "fluids."

Electrodialysis apparatus principally serve two purposes. They are either employed, in a more general application, to fractionate fluids into their constituents, or they are used, in a more specific application, to increase or decrease the ionic concentration of fluids.

The invention provides an apparatus of the multi-diaphragm type in which the spaces between at least certain membranes are bridged by a porous filler of ion exchange material. This filler provides a path of reduced resistance for the electric current traversing the spaces between membranes, and provides a conductive path in the event the liquids and gases passing through the filler are non-conductive.

The use of macroporous beds of ion exchange material as such is, of course, conventional. Beds of ion exchange material are used in conventional dialyzers of the non-electric type for purifying solutions, a rather common use being the demineralization of water.

It has also been proposed to use granular ion exchange material in an apparatus of the electric type for the removal of bacteria from fluids. In the known form of apparatus no membranes are employed and no electrodialysis is involved.

In both the non-electric and the electric type of apparatus it is necessary to regenerate the ion exchange material, since the material acts in the way the name implies, by capturing objectionable ions from the solution to be treated and liberating, in turn, unobjectionable ions.

According to the present invention the ion exchange material employed as a filler between membranes requires no regeneration and its purpose is not to adsorb certain ions and liberate other ions in their stead, but to act as a conductive bridge between the membranes and to pre-establish a path of reduced resistance for the ions travelling from one electrode toward the other. The filler even permits treatment of non-conductive media such as non-conductive solutions, or gases which, without the presence of the filler, would not conduct a current.

It has also been suggested to extract moisture from peat moss by electrodialysis. In that instance, however, peat moss is the substance to be treated and not, like the filler in the present invention, a means for treating liquids, vapors and gases.

The filler employed according to the present invention constitutes a prepared path of higher ionic conductivity for the ions to be transferred than is provided by the fluid itself.

This arrangement leads to numerous advantages:

The membranes can be spaced relatively widely without unduly increasing the resistance of the apparatus.

The effects of polarization are minimized by the filler. It has been proposed to reduce the effects of polarization by increase in the flow velocity of the fluid. This leads to an increase in the size of the apparatus, if each fluid particle is to be maintained under the influence of the electric current for a given time. In apparatus constructed according to the invention the effect of the polarization layer is minimized by the filler itself. The filler is in physical contact with the membranes, and therefore pierces the polarization layer which tends to form.

No permselective membranes have yet been developed, as far as I am aware, which are one hundred percent effective in the sense that they permit ions of only one polarity to pass freely, while preventing passage of all ions of the opposite polarity.

Depending on the concentrations, the current density, and other factors, permselective membranes "leak" in varying degrees and there are many instances in which leaking ions contaminate the fluid on the other side of the membrane.

The filler provided according to the present invention constitutes a preferred path for such leakage ions, making it possible to control the path of the leakage ions such a way that contamination of the fluid is minimized or entirely prevented.

These and various other objects, features and advantages of the invention will appear more fully from the detailed description which follows, accompanied by drawings showing, for the purpose of illustration, a preferred embodiment of the invention. The invention also resides in certain new and original features of construction and a combination of elements hereinafter set forth and claimed.

Although the characteristic features of this invention which are believed to be novel will be particularly pointed out in the claims appended hereto, the invention itself, its objects and advantages, and the manner in which it may be carried out, may be better understood by referring to the following description taken in connection with the accompanying drawings forming a part of it in which:

Figure 4 is a cross-sectional view illustrating a further modification of the apparatus of Figure 3 by limiting the fluid supply to certain chambers;

Figures 5 to 11 are diagrammatic representations of various combinations of membranes and fillers in apparatus of the type illustrated in Figures 1 to 4.

While the principles of the invention are advantageously applied to apparatus containing only three compartments, the invention is best explained by describing specific forms of multi-compartment apparatus embodying the inventive concept, and considering their operation and advantages.

Figure 1:
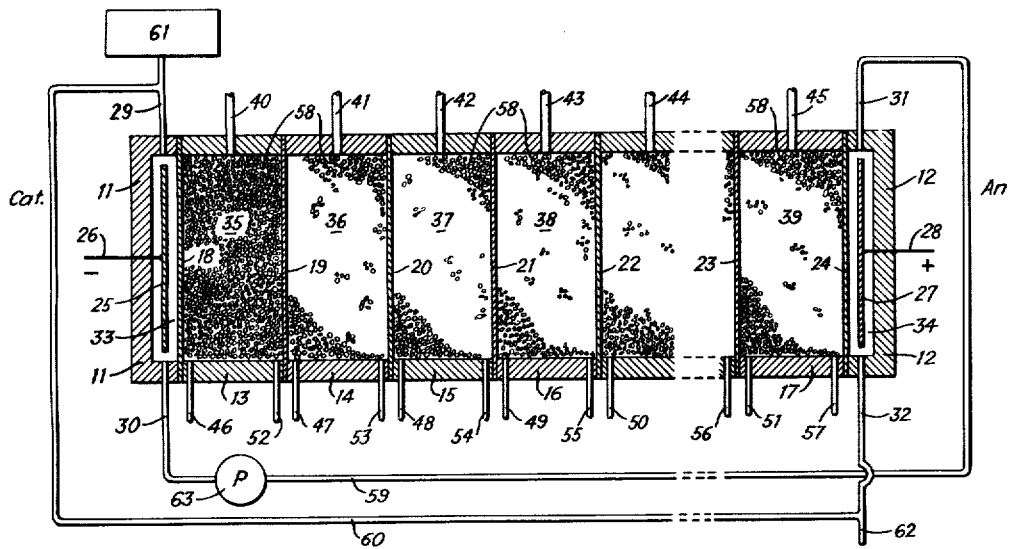
Figure 1 is a cross-section, partially diagrammatic and simplified, of an apparatus embodying the present invention.

Figure 1 is a diagrammatic illustration of a multi-diaphragm apparatus comprising end wall portions 11 and 12 between which frames 13, 14, 15, 16 and 17 are arranged. Fluid separating membranes 18, 19, 20, 21, 22, 23 and 24 are mounted between the frames, and between the endmost frames and the end portions, respectively.

An electrode 25 connected to a lead 26 is mounted adjacent the end wall portion 11 and a further electrode 27 connected to a lead 28 is mounted adjacent the opposite end wall portion 12. The membranes 18 and 24 form electrolyte chambers 33 and 34 with the end wall portions 11 and 12 respectively. Intermediate treatment chambers 35, 36, 37, 38 and 39 are arranged between the electrolyte chambers and are partitioned from one another by the membranes 19, 20, 21, 22 and 23. As the illustration indicates, the number of intermediate chambers may be considerably greater than shown. This is indicated by broken lines to the left of the chamber 39.

Electrolyte may be supplied to, and withdrawn from, the electrode chambers 33 and 34 by ducts 29, 30 and 31, 32, respectively.

Fluid to be treated may be supplied to the intermediate chambers through ducts 40, 41, 42, 43, 44 and 45. Fluid may be withdrawn from the intermediate chambers to the right of each of the membranes by withdrawal ducts 46, 47, 48, 49, 50 and 51. Further withdrawal ducts 52, 53, 54, 55, 56 and 57 are provided for withdrawing fluid from the intermediate chambers immediately to the left of the respective membranes 19, 20, 21, 22 and 23.

A porous filler 58 of ion conductive material fills the intermediate chambers, extending from one bordering membrane to the next.

Referring now briefly to the materials employed, the electrodes 25 and 27 are made from a material selected for durability in the presence of the fluid present in the electrode chamber. In view of the wide variety of fluids which may be employed a considerable range of materials can be used. Platinum, silver, copper, stainless steel, carbon are examples of materials which may be chosen.

Referring to the membranes, there are several types of membranes which may be employed. A certain type of commercially available membrane has the property of being permeable to anions and passage resistant to cations. Such a membrane is commonly referred to as an "anion membrane." As examples of typical anion membrane materials, but not in a limiting sense, may be mentioned "Amberlite" IRA 400, "Amberlite" IRA 410, and "Amberlite" IR4B, all produced by Rohm and Haas, Philadelphia, Pa.

Another type of commercially available membrane has the property of being permeable to cations and passage resistant to anions. Such a membrane is commonly referred to as a "cation membrane." As examples of typical membrane materials may be mentioned "Amberlite" IR 120 of Rohm and Haas. However, similar materials are also produced by other manufacturers, for example, by Ionics, Inc. of Cambridge, Mass.

The manufacture of "Amberlite" membranes is disclosed by Wyllie and Patnode in Journ. Phys. and Colloid Chem. 54; pp. 204–226 (1950). The manufacture of other commercially available permselective membranes is disclosed in the U. S. Patents Nos. 2,510,262, 2,636,851 and 2,636,852.

A further type of commercially available membrane has no pronounced ion selectivity and is for this reason referred to as "neutral." Examples of neutral membrane materials are sheets of porous resinated paper or porous sheet rubber, materials of which separators for storage batteries are made. If employed in apparatus embodying the present invention, the pore size of neutral membranes should preferably be greater than the pore size of the permselective anion or cation membranes used in the same apparatus.

Still another type of commercially available membranes is permeable to both anions and cations for example by reason of consisting of both the constituents which normally make up an anion membrane and a cation membrane. Such membranes are generally called "amphoteric."

The filler 58 consists of a layer of granular beads, fibers or other particles of electrically conductive ion exchange material of anionic, cationic or amphoteric character.

Following are lists of ion exchange materials. For certain of the materials the total exchange capacity in milliequivalents per milliliter is given.

*Cationic exchangers*

| | |
|---|---|
| Amberlite IR–120, strong acid resin | 2.15 |
| Dowex 50, strong acid resin | 2.20 |
| Dowex 30, strong acid resin | 1.35 |
| Amberlite IR–105, strong acid resin | 1.00 |
| Amberlite IR–100, strong acid resin | .65 |
| Amberlite IR–112, strong acid resin | 1.4 |
| Zeo-Karb, strong acid, sulfonated coal | .6 |
| Dowex 50, 16% crosslinking strong acid | 2.5 |
| Dowex 50, 12% crosslinking strong acid | 2.3 |
| Dowex 50, 8% crosslinking strong acid | 1.8 |
| Dowex 50, 4% crosslinking strong acid | 1.1 |
| Dowex 50, 2% crosslinking strong acid | .7 |
| Dowex 50, 1% crosslinking strong acid | .4 |
| Amberlite IRC–50, weak acid | 4.2 |
| Permutit 216, weak acid | 1.7 |

Certain inorganic materials are cationic ion exchangers. Examples of such inorganic materials are: natural and synthetic alumino silicates, zeolites such as montmorillonite, kaolinite, glauconite, Permutit, Decalso, Zeo-Dur, different clays, bentonites, silicates, fuller's earth, silica gel, treated activated carbons, charcoals and the like of different pore sizes and porosities.

The inorganic exchangers generally have a lower ratio of iron content to content of solvent than the resinous exchangers.

*Anionic exchangers*

| | |
|---|---|
| Amberlite IRA–400, strong base | 1.00 |
| Amberlite IRA–410, strong base | 1.00 |
| Dowex 1, strong base | 1.00 |
| Dowex 1: | |
|     10% crosslinking strong base | 1.5 |
|     8% crosslinking strong base | 1.4 |
|     4% crosslinking strong base | 1.2 |
|     2% crosslinking strong base | .8 |
|     1% crosslinking strong base | .5 |
| Amberlite IR–4B, weak base | 2.5 |
| Amberlite IR–45, weak base | 2.0 |
| Duolite A–3, weak base | 1.1 |

Among the inorganic anionic exchange materials are alumina, magnesia, heavy metal silicates, clays and bentonites, and activated carbons.

Amphoteric exchangers may consist of mixtures of cationic and anionic materials. These may be resinous, synthetic or natural.

Examples of natural amphoteric exchangers are the bentonites, alumina, and many clays, treated or untreated. These substances are generally anion exchangers at low pH of the contacting electrolytes, and are cation exchangers at high pH of the contacting electrolyte. At intermediate pH ranges, which differ for each substance they are capable of acting as anion as well as cation exchangers.

For example, a certain bentonite at pH 3.5 has a cation ($NH_4$) exchange capacity of 2.7 milliequivalents and an anion ($SO_4$) exchange capacity of 7.0. At pH 5.5 the same material is an anion ($SO_4$) exchanger of 1.0 and a cation ($NH_4$) exchanger of 8 milliequivalents capacity. At pH 4.25 the material is amphoteric and has an exchange capacity for both cations and anions of 4.2 milliequivalents each.

Amphoteric fillers and membranes may also be made from a mixture of equivalent quantities of beads or granules of cation and anion exchange material. Amphoteric fillers may be formed by layers of alternating cation and anion exchange material granules, each layer extending from membrane to membrane across the chambers. However, both amphoteric filler beads or granules and membranes are preferably made from amphoteric ion exchange material. Such material may be a granular resin substance composed of a mixture of ion adsorbent resin monomers or chain polymers.

A quantity of an anion resin monomer solution and an equivalent quantity of a cation monomer solution may be mixed with a suitable copolymerising solution and the mixture polymerized as well known in the art to form resin beads or granules.

Similarly, a quantity of anion resin chain polymer solution and equivalent quantity of cation resin chain polymer solution may be mixed with a suitable copolymerising solution and the mixture polymerized. The chain polymers may consist of 2 to 500 monomers. The effective pore size of the amphoteric resin may be varied by suitable choice of the degree of cross-linking during polymerization or copolymerization and by suitable choice of the relative quantity of the copolymerizing agent. Techniques are well known for carrying out the aforementioned manufacturing procedure, and the control of such processes permits predetermined characteristics of the material to be attained.

Such characteristics include the effective pore size and the corresponding water content of the resin, which in the state of water immersion should preferably be 50% to 90% to provide for optimum high electrical conductivity. Conductivities of the order of that of a .4 N KCl in water solution are preferred for the purpose of the present invention.

Membranes are generally made from a mixture of finely ground ion exchange resin of a mesh size 100 to 1,000 and finely ground thermoplastic bonding material such as polystyrene or methyl methacrylate resin, at a volume ratio 70 to 80% dry ion exchange resin and 20 to 30% bonding material. The material is compression molded under high pressures up to 5,000 pounds per square inch and high temperatures, as well known in the art.

The finely ground ion exchange resin particles may also be cemented together by a porous cement. They may be cemented with a viscose solution and subsequently treated with HCl solution for regeneration of the viscose to ethyl cellulose. They may also be cemented with cellulose acetate solution with subsequent saponification of the acetate to ethyl cellulose. Polystyrene solutions may also be used as cements with subsequent evaporation of the solvent, leaving a porous polystyrene structure bonding the resin particles together.

Amphoteric membranes are made from either amphoteric ion exchange resin, or from a mixture of cationic and anionic resin in equivalent quantities in an extremely fine state of subdivision by grinding the components to particle size between 500 and 2,000 mesh. The particles are bonded by molding, cemented with a porous cement, as previously explained.

While non-resinous ion exchange substances may be used, resinous substances are preferred because of their elasticity.

The filler substance, for example the resin granules, is filled into the chambers of the apparatus, either in dry form, or wetted by a highly concentrated ionic solution.

The filler granules subsequently expand under exposure to solutions of lower ionic concentration. In their expanded state they bear against the membranes with a pressure sufficient to cause flattening of the granules to some degree at the points of contact. The flattened contact points form enlarged areas of low electrical resistance through which the current passes. In order to reinforce the membranes against the force of the swelling filler, the membranes may be backed by suitable spacer structures, as will later be described.

It may be assumed that all the membranes 18, 19, 20, 21, 22, 23 and 24 are anion permeable and cation passage resistant. It may further be assumed that the filler 58 in the intermediate chambers 35, 36, 37, 38 and 39 is a macroporous filler of anion-permeable, cation-passage-resistant material. It may also be assumed that the lead 26 leads to the negative pole of a source of direct current, making the electrode 25 a cathode, and that the lead 28 extends to the positive pole of the same source making the electrode 27 an anode. The filler 58 is so selected with regard to the membrane material that the ratio of ion to water transfer for the same ion, and for the fluid to be treated, is unequal, preferably greater for the membrane than for the filler.

For the purpose of this invention the ion-to-water transfer ratio, or more generally, the ion-to-solvent transfer ratio is understood as being the ratio of the driving ions to the net solvent transported across the ion exchange material in the same direction. The net solvent transfer may be the solvent transfer obtained by the driving ions less the solvent transfer occurring in the opposite direction by reason of leakage ions.

The dissociation in resinous ion exchangers of the strong acid and strong base type is high. For such and other membrane and filler materials capable of containing the electrolyte components in high degrees of dissociation or in highly ionized condition, the ion-to-water transfer ratio is, for practical purposes, about equal to the ion exchange capacity divided by the adsorbed water content of the material measured in pure water immersion. For example, the cation exchange resin Dowex 50 with 16% crosslinking has an ion exchange capacity of 2.5 milliequivalents, and Dowex 50 with 2% crosslinking has an exchange capacity of .7 milliequivalents per milliliter volume and for approximately the same water content. The ion to water transfer ratio of the two materials is approximately equal to the ratio of their exchange capacities, that is 2.5 to .7, a satisfactory approximation of the ion to solvent ratio for the purpose of practicing this invention.

In ion exchangers of the weak acid and weak base type the degree of ionization depends on the pH of the contacting electrolyte. Generally, a weak acid exchanger contains a large portion of its total ion exchange capacity in ionized form only at high pH of the contacting electrolyte, and a weak base exchanger contains a large portion of its total ion exchange capacity only at low pH of the electrolyte.

The ionization in both exchanger types is greatest however, if the contacting electrolyte is a salt solution. For this reason it is preferred to use weak acid and weak base exchangers with salt solutions as electrolyte, preferably at a pH which will produce the highest ionization within the exchangers.

For the purpose of this invention it is generally satisfactory to choose a membrane material of an ionic concentration different from, or larger than the ionic concentration in the filler material, both materials being in the ion form of the electrolyte.

A separating action, which, as hereinbefore described, is a result of a difference in the ion-to-solvent transfer ratio by reason of unequal ionic concentration in the membranes, as compared to the filler, may also be produced by unequal adsorbability of certain mixture components.

Assuming, for example, that carbon or activated carbon membranes are combined with a silica gel filler, or silica gel membranes with a carbon filler, the silica gel adsorbs water preferentially, whereas the carbon having a lower dielectric constant, preferentially adsorbs a solvent component also having a lower dielectric constant, for example, acetone, assuming the solvent to be a mixture of water and acetone.

If, therefore, the membrane and filler material are compared with regard to their ion-to-solvent transfer ratios, the comparison is made on the basis of the same solvent component. In this event, filler and membranes should be materials of different dielectric constants, and a cationic or anionic bias should be employed as later described in connection with Figure 11.

It may be assumed that the fluid to be treated is a mixture of 30% water and 70% acetone. This mixture is electrically nonconductive. The purpose of the treatment is to separate acetone from water.

The fluid supplied to the electrode chambers is preferably an ionic fluid containing as a solvent a fluid which is at least as readily adsorbed by the ions as the most adsorbable component of the fluid to be treated.

As a general rule the dielectric constant of the fluid furnishes a measure of its adsorbability. A table of the dielectric constants of fluids may be found on page 457 of Dole "Experimental and Theoretical Electrochemistry," McGraw-Hill, 1935. To illustrate: Assuming that the fluid to be treated is a mixture of acetone and methyl alcohol, the most adsorbable component of the mixture is methyl alcohol. The above mentioned table shows that water is even more readily adsorbable than methyl alcohol, and therefore suited as a solvent for the ionic fluid supplied to the electrode chambers.

The chlorides or hydroxides of lithium, sodium and potassium are suitable as electrolytes. Their aqueous solution may be of the order of .001 to 1.0 N. The electrolyte may be circulated through the electrode chambers 33 and 34 by connecting ducts 30 and 31 as shown at 59 and also connecting ducts 29 and 32 as shown at 60 in Figure 1.

When a potential is applied to the electrodes 25 and 27, a current flows, provided there is a conductive path extending from one electrode to the other. The electrolyte in the electrode chambers, and the conductive filler in the intermediate chambers provides such a conductive path.

Since the electrode 25 is the cathode, and since the electrode 27 is the anode, the chlorine anions in chamber 33 tend to travel to the right toward the electrode 27 and the potassium cations tend to travel from the right electrode chamber to the left toward the cathode 25.

While I do not desire to limit the scope of this invention by possible inaccuracy of the following theory, the following appears to be a reasonable explanation of the operation of the apparatus in general, and the behavior of the ions in particular:

All ions have a tendency of collecting a so-called solvent shell around them. This solvent shell is composed of molecules of the most readily adsorbable fluid component available in the surroundings of the ion. Each chlorine anion in the electrode chamber 33 is surrounded by a water shell. Permselective materials contain a certain number of bound electric charges in their structure which are countered by an equivalent number of mobile counter charges in the pores of the material. The number of bound charges in the pores of the membranes determines the ionic concentration of the fluid in the pores. The chlorine anions passing through the anion membrane 18 enter the anionic filler 58 in the chamber 35 with a water shell whose size is determined by the ionic concentration existing in the pores of the anion membrane 18.

The anionic filler 35 was selected to have an ion-to-solvent transfer ratio which is less than that of the anion membrane 18. In other words, the ions passing through the filler may be accompanied by a larger solvent shell than the ions passing through the membranes. As a chlorine anion enters the filler 35, it immediately enlarges its water shell by withdrawing water from the water-and-acetone mixture adjacent the membrane 18. The mixture is therefore locally depleted of water, leading to a corresponding increase in acetone concentration. Concentrated mixture may therefore be withdrawn through the duct 46.

If, on the other hand, the ion-to-solvent transfer ratio of the filler is greater than that of the membrane, the ions give up a portion of their water shells and dilution occurs adjacent the membrane 18.

The chlorine ions travelling through the pores of the filler material reach the next anion membrane 19 in whose pores a higher ionic concentration prevails. The chlorine anions entering the pores of the membrane accordingly are stripped of part of their water shell, leading to water enrichment of the mixture along the left surface of the membrane 19. Mixture of increased water content, and, accordingly, reduced acetone content, may be withdrawn from the chamber 35 through the duct 52.

As the chlorine ions leave the membrane 19 and enter the pores of the filler 58 in the next chamber 36, they enlarge their water shell, withdrawing water from the mixture flowing through the chamber 36. As the chlorine anions enter the next anion membrane 20 part of their water shell is stripped as previously explained.

This continues until the chlorine finally arrives at the anode 27, where the chlorine anion plates out, and forms $Cl_2$ gas.

Considering now the potassium cations present in the right electrode chamber 34, these cations, as well as any cations in the intermediate chambers move as far as the nearest cation-passage-resistant membrane and are retained by the membrane in the respective chamber in which they originated except for leakage due to imperfection of the membranes.

The potassium cations originally present in the cathode chamber 33 plate out leading to the formation of potassium hydroxide.

The anode liquid including the aforementioned $Cl_2$ is recirculated into the cathode chamber through the connecting duct 59. In the cathode chamber 33 the $Cl_2$ decomposes the KOH present therein and forms KCl for continued operation of the apparatus.

Continued recirculation tends to reconstitute the original KCl solution in the cathode chamber, but additional KCl solution may be supplied from a tank 61. Fluid from the tank 61 may continuously be supplied to the apparatus depending upon the amount of fluid withdrawn from the connecting duct 60 at 62. A pump 63 may be provided for circulating the fluid.

The operation of the apparatus in treating a gas mixture will be considered next. It may be assumed that the mixture is composed of acetone vapor and air. Acetone is the most readily adsorbable component of the mixture and, accordingly, behaves similarly as the water in the previous example involving water and acetone mixtures.

It may be assumed that KCl solution, in either water or acetone, is supplied to the cathode chamber 33. A mixture of acetone and air is fed into the intermediate chambers 35, 36, 37, 38 and 39 through the ducts 40, 41, 42, 43 and 45. The intermediate chambers are filled with a macroporous filler of an anion exchange material which is permeated by the gas mixture.

The Cl anions originating in the cathode chamber 33 pass through the anion permeable membrane 18 with a certain small water shell, and enter the pores of the filler 58. The driving anions pick up acetone from the acetone and air soaked filler to increase the size of their solvent shells. As the anions enter the next anion membrane 19, acetone molecules are stripped off and form an acetone enriched layer along the left surface of the membrane 19.

Mixture of reduced acetone content may be withdrawn through duct 47 and mixture of increased acetone content may be withdrawn through the duct 52. Under appropriate conditions of temperature acetone condenses and is partially recoverable in liquid form.

The filler which gives up acetone to the driving ions within the zone in which the enlargement of the solvent shells takes place, replenishes itself from the air and acetone mixture entering the chamber and permeating the filler.

From the foregoing description the following considerations may be summarized as essential:

It is essential that the ion-to-solvent transfer ratio of membranes and filler is unequal, since the increase and the decrease in the size of the solvent shell depends on this inequality. Preferably, the ion-to-solvent transfer ratio of the membrane should exceed that of the filler.

It is further essential that a continuous path is provided for the driving ions. In the foregiven example the anions may be considered driving ions, since they traverse the entire apparatus and are the immediate cause of the depletion or accumulation of the most adsorbable component of the mixture along the membrane surfaces.

It is further essential that a continuous conductive path is provided for the ions. In the treatment of non-conductive fluid mixtures it is therefore necessary to provide a conductive filler in each and every of the intermediate compartments. A filler is not necessarily required in the electrode compartments because of the conductivity of the electrolyte therein.

If the fluid mixture to be treated is of a conductive nature, the filler could be omitted from certain or all of the intermediate chambers. This however, may lead to certain disadvantages which the presence of the filler eliminates.

The changes in ionic concentration, more particularly the enrichment in the solvent along certain surfaces of the membranes creates zones of reduced conductivity which impair the functioning of the apparatus. The conductive filler effectively bridges these zones of reduced conductivity, thereby counteracting the effects of polarization.

The pore size of the filler should be so selected as to accommodate the size of the components which are to form the solvent shells. The literature contains tables and charts of the mean effective pore size of available ion exchange materials as well as of the size of the molecules permitting determination of the given mean pore size for a given molecule.

It is evident that a non-conductive fluid can only be treated with a conductive filler in the intermediate compartments since no current would flow through the compartments in the absence of a filler.

The type of apparatus illustrated in Figure 1 may be modified by substitution of an amphoteric filler for the anionic filler.

An amphoteric filler is capable of conducting anions as well as cations. It therefore acts as a conductor for the driving anions. This is the desired function of the filler.

The filler also conducts the cations which tend to move in the opposite direction, if cations are present in the intermediate chambers. This is normally the case in the treatment of fluids of conductive character. However, the conductivity of the amphoteric filler to cations is not objectionable because of the presence of the anion membranes which block the path of the cations.

An amphoteric filler is equally suited for the treatment of non-conductive liquid mixtures, conductive liquid mixtures and gas mixtures, provided that the transfer ratio of its driving ions to solvent is unequal to, but preferably less than, that of the permselective membranes with which the filler is combined.

A cationic filler may also be associated with anion membranes. In that combination, the purpose and function of the apparatus is the same as in the previous examples. For example the membranes 18, 19, 20, 21, 22, 23 and 24 may be composed of Amberlite IRA-400, and the filler may be fuller's earth, silica gel or a weakly cationic alumino silicate, natural or synthetic. Fuller's earth is a preferred filler material because of its freedom from swelling and shrinkage and its needle-like structure which affords strength and resiliency.

In this arrangement the conductivity of the membranes should predominate over the conductivity of the filler. If this condition is satisfied, the apparatus, in its entirety, is permselective with regard to anions.

The cationic filler, which provides a preferred path for cations does not constitute a bar to anions and is therefore operative as an ion conductive bridge between the permselective membranes.

Tests appear to establish that a higher potential is required to produce the same current, or in other words, the same anion flow, as compared to an apparatus equipped with anion membranes and anion filler.

Summarizing the characteristics of the filler employed in the present apparatus, the general requirement is that it should consist of a material capable of adsorbing ions, and that it should have sufficient porosity to permit ions to pass therethrough. As a result the filler becomes conductive. While all substances which are ion adsorbent and porous are useful as a filler, substances are preferred which are capable of adsorbing ions of the polarity of the driving ions. Amphoteric fillers meet this requirement.

The most advantageous type of filler comprises the substances which adsorb preferentially or exclusively ions of the polarity of the driving ions. Filler materials comprising bound charges of one polarity and, therefore, capable of adsorbing primarily ions of the opposite polarity are preferred for operation with driving ions of the opposite polarity.

If the filler comprises bound charges of positive and negative polarity, the filler is efficiently operative with driving ions of either positive or negative polarity, in other words, with cations and anions. Fillers comprising bound charges of one polarity primarily adsorb mobile ions of the opposite polarity. Since, however, the adsorbed ions of the said opposite polarity also tend to adsorb ions of the one polarity, the filler is also operative with driving ions of the one polarity, but to a lesser degree.

An anion drive is not dependent on the presence of anionic membranes, but is rather the result of preferential permeability to anions of the entire apparatus including membranes and filler.

An anion drive may be produced in an apparatus containing amphoteric membranes and an anionic filler. It may also be produced in an apparatus containing cationic membranes and an anionic filler. In this instance the anionic content of the filler must predominate over the cation content of the membranes. Anions then pass through the membrane as so-called leakage ions.

The property of permselective membranes of resisting passage of ions of the polarity of the bound charges in the membrane decreases with an increase of the ionic concentration of the contacting fluid. Under conditions of relatively high ionic concentration the membranes permit ions of the polarity of the bound charges to "leak" therethrough. This property of the membranes is taken advantage of in the present invention because of the advantageous circumstance that leakage ions pass through the membrane with particularly small solvent shells. Leakage ions entering the filler are therefore capable of collecting a relatively great amount of the most adsorbable component of the fluid in the intermediate chambers of the apparatus and the concentration and dilution effect is particularly pronounced.

Leakage conditions are promoted by relatively high ionic concentration (of the order of .5 to 1.0 N) of the electrode chambers and also by application of a relatively high electric potential.

Since specific figures of voltage and concentration cannot be given generally because of many other factors, for example, physical dimensions of the apparatus which are involved, it may be sufficient to state that the leakage condition is produced by either increasing the potential to the point where a current flows, or by increasing the ionic concentration of the electrolyte in at least the cathode chamber until a current flows at any potential, or by varying both voltage and ionic concentration to a lesser extent.

The apparatus illustrated in Figure 1 may also be operated on the cation drive principle. This arrangement involves an uninterrupted passage of cations through the entire apparatus. The aforementioned fractionation, or increase and decrease in concentration occurs by reason of the increase and decrease of the solvent shells accompanying the cations.

The electrolyte employed in the electrode chambers may be the same as in the aforementioned examples illustrating the anion drive.

Several arrangements are possible. If the membranes 18 to 24 are cation membranes the filler may be composed of any ion exchange material, amphoteric and cationic fillers being preferred.

If the apparatus is operated with cations passing through the membranes as leakage ions, the membranes may be anionic. In that instance the filler must be cationic and its cation content must predominate over the anion content of the membrane.

The membranes may also be amphoteric in which case the filler must be cationic.

The operation of the apparatus employing the cation drive principle corresponds to that of the apparatus employing an anion drive with the exception that the mixture is depleted of its most adsorbable component along the surface of the membrane where the driving cations leave the membranes and pass into the filler. Enrichment of the most adsorbable mixture component occurs at the surface of the membrane where the driving cations pass into the membranes from the filler and are stripped of part of their solvent shells.

Referring to Figure 1, the ducts 52, 53, 54, 55, 56 and 57 are ducts thruogh which concentrated mixture may be withdrawn and ducts 46, 47, 48, 49, 50 and 51 are ducts through which dilute mixture may be withdrawn if the drive is cationic.

Figure 2:
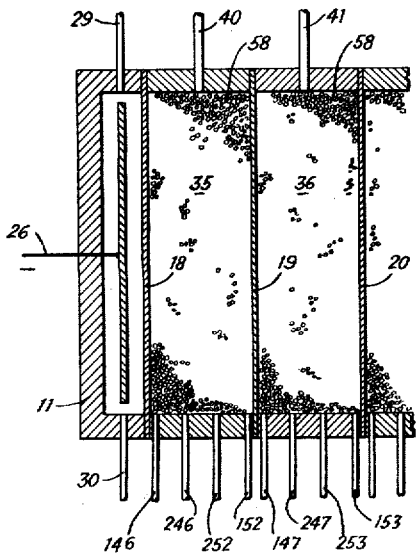
Figure 2 is a cross-sectional view illustrating a modification of the apparatus of Figure 1 by the addition of further withdrawal ducts.

In Figure 1 two withdrawal ducts are shown for each of the intermediate chambers. The number of withdrawal ducts may vary in accordance with the number of the fractions which it is desired to withdraw. Figure 2 illustrates a modification of the apparatus of Figure 1 to include four withdrawal ducts for each chamber. Referring to the previous example involving the separation of water and acetone, water tends to accumulate at one end of the chamber and acetone at the opposite end of the chamber. In case of an anion drive, acetone tends to collect nearest the membrane 18 in chamber 35 and nearest the membrane 19 in chamber 36. Water tends to collect nearest the membrane 19 in chamber 35 and nearest the membrane 20 in chamber 36. Fluid withdrawn through ducts 146 and 147 therefore has the highest acetone content and fluid withdrawn through ducts 152 and 153 has the lowest acetone content.

Fluid withdrawn through ducts 246 and 247 is lower in acetone content than the fluid withdrawn through ducts 146 and 147, and fluid withdrawn through ducts 252 and 253 contains less water than the fluid withdrawn through ducts 152 and 153. In other words, the acetone content of the withdrawn fluid decreases gradually with the distance of the withdrawal ducts of chambers 35 and 36 from the membranes 18 and 19 respectively.

Figure 3:
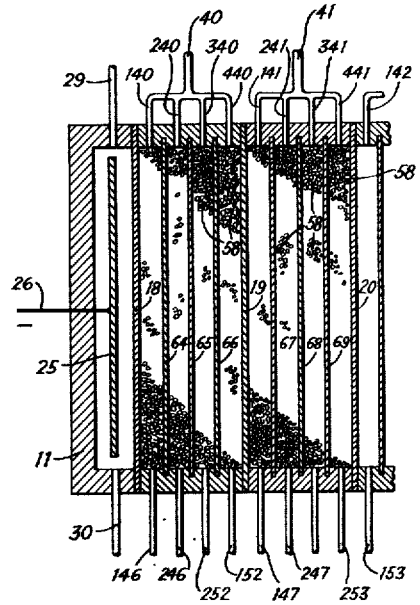
Figure 3 is a cross-sectional view illustrating a modification of the apparatus of Figure 2 by addition of separating membranes.

It is desirable in certain instances to provide a fluid barrier between the several withdrawal ducts for the purpose of maintaining the several fractions separate. Figure 3 illustrates the portion of the apparatus shown in Figure 2, modified to include subdividing membranes 64, 65 and 66 between the membranes 18 and 19 and subdividing membranes 67, 68 and 69 between the membranes 19 and 20, it being understood that a subdividing membrane is provided between each two fraction withdrawal ducts, and that there are as many fraction withdrawal ducts as may be desired, the number four being merely illustrative in Figure 3.

The subdividing membranes are preferably amphoteric membranes. The principal requirement for the subdividing membranes is that they must be permeable to the driving ions and that they must not interrupt the conductive path from electrode to electrode in case the fluid to be treated is non-conductive. Furthermore, the subdividing membrances must permit passage of the driving ions without materially reducing their solvent shells. As a general rule, a subdividing membrane of the same conductivity and solvent transfer characteristics as the filler performs satisfactorily.

In the apparatus of Figure 3 the main supply ducts 40 and 41 have branches 140, 240, 340, 440 and 141, 241, 341, 441, respectively, through which fluid is supplied to the several spaces.

It is not necessary to supply fluid to all of the spaces between the subdividing membranes, since the transfer of ions through the membranes is accompanied by a transfer of fluid. As shown in Figure 4, the supply ducts 40 and 41 feed into the spaces by the main membranes 18, 19, and the subdividing membranes 64 and 67 respectively. In the illustrated example an anion drive is employed with the result that the transfer of fluid takes place from the left to the right. The fraction withdrawn through the leftmost withdrawal ducts 146 and 147, containing the highest percentage of acetone, is formed in the leftmost compartment without necessity of diffusion of leakage of the fraction from spaces nearer the anode, as would be required in the apparatus of Figure 3 where fluid to be treated is fed into all the subdivisions of the chambers formed by the main membranes 18, 19, etc.

Various possible modifications, obtained by combining different types of filler with different main membranes and different subdividing membranes is illustrated in Figures 5 to 11.

Figures 5 and 8 diagrammatically illustrate a form of apparatus employing main membrances A. The apparatus operates on the anion drive principle. As previously disclosed, the type of the filler employed is preferably anionic or amphoteric, but it may also be weakly cationic. The subdividing membranes of Figure 8 may be anionic, amphoteric, neutral or weakly cationic. Neutral membranes, for example cellophane membranes, may be employed in instances where the fluid to be treated is conductive.

Figures 6 and 9 illustrate the same type of apparatus employing a cationic drive and using cationic main membranes C. The filler is preferably cationic or amphoteric, but may also be weakly anionic. The subdividing membranes of Figure 9 may be cationic, amphoteric or neutral, neutral membrances being operative with conductive fluids. The subdividing membranes may also be weakly anionic.

Figures 7 and 10 illustrate an apparatus employing amphoteric main membranes Am. The drive is anionic or cationic depending on the predominant characteristics imparted to the apparatus by the nature of the filler and of the subdividing membranes.

In the event an anion drive is employed, the filler should consist of anion exchange material and the subdividing membranes are either anionic, amphoteric or neutral. They may be weakly cationic, provided the anion content of the filler is greater than the cation content of the subdividing membranes.

In the event the filler is cationic and the drive cationic, the subdividing membranes may be cationic, amphoteric or neutral. In the event weakly anionic membranes are used as subdividing membranes their anion content should be less than the cation content of the filler.

The apparatus shown in Figure 11 may be considered a modification of the arrangement illustrated in Figures 8 or 9. With equal justification, however, the apparatus may be considered distinctively different in that it operates with both an anion and a cation drive. Anion membranes A alternate with cation membranes C. The filler is preferably amphoteric. The anion membranes preferably have substantially the same anion-to-solvent transfer ratio as the cation-to-solvent transfer ratio of the cation membranes. The anion-to-solvent ratio of the amphoteric filler and its cation-to-solvent transfer ratio should preferably be the same or less than that of the permselective membranes.

Considering the operation of this apparatus, anions traverse the apparatus from left to right and cations traverse the apparatus from right to left. The anions are stripped of a large portion of their solvent shells when they pass, by leakage, through the cation membranes. Thus, an accumulation of solvent occurs on the left surface of the cation membranes, in chambers 70, 71 and 72. As the anions pass into the filler after passing through the cation membranes, they enlarge their solvent shells and thus withdraw solvent from the chambers 73, 74 and 75. The solvent is then carried through the next membrane and accumulates in the following chamber. For example, solvent withdrawn from chamber 73 accumulates in chamber 71, which may be called a dilution chamber.

Considering now the action of the cations, the cations lose a portion of their solvent shells when entering the anion membranes thus further contributing to the accumulation of solvent in chambers 72, 71 and 70. The cations enlarge their solvent shells in chambers 74 and 73 thus contributing to the previously considered concentration in these chambers.

Applying the example of the treatment of acetone and water mixture to Figure 11, acetone enrichment occurs in chambers 74 and 73, whereas water enrichment occurs in chambers 72, 71 and 70.

Since the amphoteric filler provides a conductive path between the electrolyte filled electrode chambers nonconductive fluid mixtures may effectively be treated in the apparatus.

In the apparatus of Figure 11 the amphoteric filler may be replaced by a cationic or anionic filler. In the event the filler is cationic, anions are carried as leakage ions, and vice versa.

As previously set forth, an anion drive is established by predominance of the anion content of the elements of the apparatus over the cation content of the elements. In Figure 5 for example, the anion drive is the result of the predominant anion content of membranes and filler or the predominance of the anion content of the membranes over a possible cation content of the filler.

An anion drive may also be maintained with main membranes of cationic character. In this case the anion content of the filler must exceed the cation content of the membranes. This arrangement is not at all unfavorable since the anions pass through the cation membranes as leakage ions and are consequently stripped of a relatively large portion of their solvent shells.

In an apparatus composed of elements which in their entirety have an anion content of filler and membranes substantially equal to the cation content of the filler and membranes, a biasing effect may be introduced by addition of an element traversed by the current containing a relatively high content of either anions or cations. For example, for this purpose, any one of the membranes, for example, a membrane bordering one of the electrode chambers may be made of permselective material of high selectivity and a high content of the respective ions. Instead of a membrane the filler substance in one of the compartments, or even in one of the electrode chambers may be of permselective character and high ionic content.

A specific example of an apparatus in which the introduction of a biasing element is desirable is shown in Figure 7 in the modification of the apparatus in which both filler and membranes are amphoteric. In Figure 7 a biasing layer is indicated at 76. It may assume the form of a membrane or the form of a filler layer of permselective character. Its polarity determines the polarity of the drive.

The biasing means illustrated in Figure 7 may be employed in any of the described forms of the apparatus, if it is desired to reverse the bias of the apparatus or make it more pronounced. It can therefore be employed in any one of the forms of apparatus shown in Figures 1 to 6 whenever it is desired to make the anion drive or the cation drive more pronounced because of an existing near-balance or near neutrality of the apparatus. In instances where the apparatus in its entirety is so composed as to produce an anion drive or a cation drive, such drive may be rendered more pronounced by addition of a further biasing element which increases the total bias of the apparatus.

It is not necessary that the ion-to-solvent transfer ratio of the membranes exceed that of the filler. It may also be less than that of the filler. The required inequality of the ion-to-solvent transfer ratio of the membranes with regard to the filler is also fulfilled by using a filler whose ion-to-solvent transfer ratio exceeds that of the membrane. In such a case the accumulation of the most adsorbable component of the mixture occurs at the end of the respective chamber at which, in the above described forms of apparatus, depletion occurs and vice versa.

The apparatus employing alternating anion and cation membranes, as shown in Figure 11 may be provided with subdivided membranes as shown in Figures 3, 4, 8, 9 and 10. Such a combination is also obtained, for example, if in Figure 8 certain of the subdividing membranes such as membranes 81 and 82 are cation membranes or if in Figure 9 certain of the separating membranes such as membranes 83 and 84 are anion membranes.

The purpose of such subdividing membranes is to confine specific fractions to specific spaces. If, for example, the fluid to be treated contains anionic components or cationic components of different ionic conductivity, these components will stratify in the compartments of the apparatus, and the aforementioned subdividing membrances help to maintain such components separate between successive anion membranes and cation membranes.

Following are results of tests conducted with apparatus embodying the invention.

*Example I (cation drive).*—Apparatus containing 10 membranes spaced 20 mm. apart to form 9 chambers. Membrane material IR–120, one mm. thick, area of each membrane side: 100 cm.²

Filler in the 20 mm. space between the membranes: Dowex 50—2% crosslinking, beads of approximately 30 mesh size.

One inlet and 3 outlets in each chamber.

Electrodes platinum.

Electrolyte .1 N LiCl in water supplied at the rate of 15 cc./min.

Fluid to be treated 70 parts acetone and 30 parts water. Total inflow rate 1 cc./min.

*Results.*—Test No. 1—current 1200 ma. D. C.—center outlet not used.

Total outflow rate, outlet No. 1—.7 cc. Yield: .62 cc. acetone, .08 cc. water.

Total outflow rate, outlet No. 3—.3 cc. Yield: .22 cc. water, .08 cc. acetone.

Test No. 2—current 1800 ma. D. C.—center outlet not used.

Total outflow rate, outlet No. 1—.7 cc. Yield: .65 cc. acetone, .05 cc. water.

Total outflow rate, outlet No. 3—.3 cc. Yield: .25 cc. water, .05 cc. acetone.

Test No. 3—current 1200 ma. D. C.—all three outlets used.

Total outflow rate, outlet No. 1—.5 cc. Yield: .48 cc. acetone, .02 cc. water.

Total outflow rate, outlet No. 2—.3 cc. Yield: .22 cc. acetone, .08 cc. water.

Total outflow rate, outlet No. 3—.2 cc. Yield: .2 cc. water, trace of acetone.

Test No. 4—current 1800 ma. D. C.—all three outlets used.

Total outflow rate, outlet No. 1—.5 cc. Yield: .5 cc. acetone, trace of water.

Total outflow rate, outlet No. 2—.3 cc. Yield: .20 cc. acetone, .10 cc. water.

Total outflow rate, outlet No. 3—.2 cc. Yield: .2 cc. water, trace of acetone.

*Example II.*—Same apparatus as used in Example I with the exception that the Dowex filler was replaced by alumino silicate granules of approximately 50 mesh size.

Fluid to be treated 70 parts acetone and 30 parts water.
Total inflow rate 1 cc./min.

*Results.*—Test No. 5—current 200 ma. D. C.—center outlet not used.

Total outflow rate, outlet No. 1—.7 cc. Yield: .64 cc. acetone, .06 cc. water.

Total outflow rate, outlet No. 3—.3 cc. Yield: .24 cc. water, .06 cc. acetone.

Test No. 6—current 300 ma. D. C.—center outlet not used.

Total outflow rate, outlet No. 1—.7 cc. Yield: .66 cc. acetone, .04 cc. water.

Total outflow rate, outlet No. 3—.3 cc. Yield: .26 cc. water, .04 cc. acetone.

*Example III.*—Same apparatus as used in Example II.
Fluid to be treated 99 parts benzene and 1 part acetone.
Total inflow rate 4 cc./min.

*Results.*—Test No. 7—current 220 ma. D. C.—center outlet not used.

Total outflow rate, outlet No. 1—3.96 cc. Yield: 3.95 cc. benzene, .01 cc. acetone.

Total outflow rate, outlet No. 3—.04 cc. Yield: .03 cc. acetone, .01 cc. benzene.

*Example IV.*—Same apparatus as used in Example I with the exception that the Dowex filler was replaced by a granular alumino silicate filler of 20 mesh size.

Electrolyte 1 N LiCl in water.

Fluid to be treated: Air containing .032 g. of water per litre.

Total inflow rate 1000 cc./min.

*Results.*—Test No. 8a—current 140 ma. D. C.—center outlet not used.

Total outflow rate, outlet No. 1—900 cc. including .018 g. water.

Total outflow rate, outlet No. 3—100 cc. including .014 g. water.

Test No. 8b—same apparatus as in test 8a except that the apparatus was tilted to bring the originally vertical membranes into horizontal position with outlet No. 3 below outlet No. 1.

Total outflow rate, outlet No. 1—900 cc. including .015 g. water.

Total outflow rate, outlet No. 3—100 cc. including .017 g. water.

*Example V (anion drive).*—Apparatus containing 10 membranes spaced 10 mm. apart to form 9 chambers. Membrane material IRA-400, one mm. thick, area of each membrane side: 100 cm.²

Filler in the 10 mm. space between membranes: Dowex 1—2% crosslinking, beads of approximately 30 mesh size.

One inlet and 2 outlets in each chamber.
Electrodes platinum.
Electrolyte .1 N KCl in water supplied to the apparatus at the rate of 15 cc./min.

Fluid to be treated: 70 parts acetone and 30 parts water.
Total inflow rate 1 cc./min.

*Results.*—Test No. 9—current 1650 ma. D. C.

Total outflow rate, outlet No. 1—.77 cc. Yield: .61 cc. acetone, .09 cc. water.

Total outflow rate, outlet No. 2—.3 cc. Yield: .21 cc. water, .09 cc. acetone.

Test No. 10—current 2475 ma. D. C.

Total outflow rate, outlet No. 1—.7 cc. Yield: .64 cc. acetone, .06 cc. water.

Total outflow rate, outlet No. 2—.3 cc. Yield: .24 cc. water, .06 cc. acetone.

*Example VI.*—Apparatus containing 10 membranes spaced 20 mm. apart to form 9 chambers. Material of main membranes IRA-400, one mm. thick, area of one surface: 100 cm.²

Space between main membranes subdivided by two sub-dividing IR-120, one mm. thick membranes.

Filler between membranes: IR-120, beads of approximately 30 mesh size.

One inlet and one outlet in each chamber subdivision, there being three outlets between each two main membranes.

Electrodes platinum.
Electrolyte .5 N LiCl in water supplied to the apparatus at the rate of 5 cc./min.

Fluid to be treated: 70 parts acetone and 30 parts water.
Total inflow rate 1 cc./min.

*Results.*—Test No. 11—current 960 ma. D. C.—center outlet not used.

Total outflow rate, outlet No. 1—.7 cc. Yield: .6 cc. acetone, .1 cc. water.

Total outflow rate, outlet No. 3—.3 cc. Yield: .2 cc. water, .1 cc. acetone.

Test No. 12—current 1440 ma. D. C.—center outlet not used.

Total outflow rate, outlet No. 1—.7 cc. Yield: .66 cc. acetone, .04 cc. water.

Total outflow rate, outlet No. 3—.3 cc. Yield: .26 cc. water, .04 cc. acetone.

Test No. 13—current 960 ma. D. C.—all three outlets used.

Total outflow rate, outlet No. 1—.5 cc. Yield: .5 cc. acetone, approximately no water.

Total outflow rate, outlet No. 2—.3 cc. Yield: .2 cc. acetone, .1 cc. water.

Total outflow rate, outlet No. 3—.2 cc. Yield: .2 cc. water, approximately no acetone.

Apparatus works with cations Li leaking through anion membranes.

*Example VII (fractionation of cations).*—Apparatus same as used in Example VI.

Mixture fluid a solution of 9 g. MaCl, 4 g. LiCl in 1000 g. water.

Electrolyte .1 N KCl in water supplied to the apparatus at a rate of 15 cc./min.

Total inflow rate .5 cc./min.

*Results.*—Test No. 14—current 800 ma. D. C.—all three outlets used.

Total outflow rate, outlet No. 1—.30 cc., including .0015 g. LiCl and a trace of NaCl.

Total outflow rate, outlet No. 2—10 cc., including .0010 g. NaCl and .0005 g. LiCl.

Total outflow rate, outlet No. 3—.10 cc., including .0035 g. NaCl and a trace LiCl.

*Example VIII.*—Apparatus containing 20 membranes spaced 5 mm. apart to form 19 chambers. Membrane material: 10 membranes IR-120, one mm. thick, 10 membranes IRA-400, one mm. thick, alternating and so arranged that an IR-120 membrane borders the cathode chamber and that an IRA-400 membrane borders the anode chamber. Surface area of membranes: 100 cm.²

Filler: a mixture of IRA-400 and IR-120 beads approximately 30 mesh size in equal amounts.

One inlet and one outlet in each chamber, alternate chambers are manifolded at inlet and outlet.

Electrodes platinum.
Electrolyte .5 N KCl in water, supplied at a rate of 5 cc./min.

Fluid to be treated 70 parts acetone and 30 parts water.
Inflow rate 1 cc./sec. supplied to both dilution and concentration chambers.

*Results.*—Test No. 15—current 1120 ma. D. C.

Total outflow rate from manifolded concentration chambers—.7 cc. Yield: .65 cc. acetone, .05 cc. water.

Total outflow rate from manifolded dilution chambers—.3 cc. Yield: .25 cc. water, .05 cc. acetone.

*Example IX.*—Same apparatus as in Example VIII except that the IR-120 filler was replaced by silica gel in granules of approximately 30 mesh size.

Electrolyte 1 N KCl and water.

Fluid to be treated air containing .032 g. water per litre.

Inflow rate 1000 cc./min.

*Results*—Test No. 16—current 180 ma. D. C.

Outflow rate, outlet No. 1—900 cc. including .014 g. water (dilution chamber).

Outflow rate, outlet No. 2—100 cc. including .018 g. water (concentration chamber).

*Example X.*—Same apparatus as in Test No. 14, but filler omitted.

*Results.*—Test No. 17—current 600 ma. D. C.

Outlet No. 1—.0004 LiCl, .0005 NaCl.

Outlet No. 2—.0004 LiCl, .0009 NaCl.

Outlet No. 3—.0012 LiCl, .0031 Nacl.

This test shows that substantial quantities of NaCl and LiCl are present where there were only traces in the apparatus employing a filler.

For greatest efficiency the membrane materials and the filler materials should be so selected that the difference of their ion-to-solvent transfer ratios is as great as possible. Materials of high ionic conductivity are preferred.

Following is a list giving, for the purpose of example, advantageous combinations of membranes and filler materials:

| Membranes | Filler in granule or bead form (10 to 50 mesh) |
| --- | --- |
| *Cation Drive* | |
| I. Direct Operation: | |
| IR-120 or Dowex 50—16% crosslinking 1 mm. thick. | IR-100 or Dowex 50—2% crosslinking or Alumino Silicates, Fuller's Earth, clays, Bentonites, Silica Gels, activated carbons. |
| II. Leakage Operation: | |
| (a) IRA-400 or Dowex 1, 1 mm. thick. | IR-120 10 mm. thick or Dowex 50 10 mm. thick. |
| (b) Dowex 1—2% crosslinking 1 mm. thick. | Fuller's Earth 50 mm. thick. |
| (c) Dowex 1—2% crosslinking 1 mm. thick. | Silica Gel 10 mm. thick with a biasing filler or membrane of IR-120 thicker than the total thickness of all other membranes. |
| *Anion Drive* | |
| I. Direct Operation: | |
| (a) IRA-400 or Dowex 1—10% crosslinking 1 mm. thick. | Dowex 1—2% crosslinking or Alumina, heavy metal silicates. |
| (b) IRA-400 or Dowex 1—10% crosslinking 1 mm. thick. | Bentonites, Silica Gel, clays, activated carbons, in a layer of 10 mm. thickness. |
| (c) IRA-400 1 mm. thick. | Silica Gel, carbons in a layer of 50 mm. thickness with an IRA 400 biasing layer of a thickness 1/10 of the total thickness of the fillers. |
| II. Leakage Operation: | |
| (a) IR-120 or Dowex 50—16% crosslinking 1 mm. thick. | IRA-400 or Dowex 1—10% crosslinking 10 mm. thick. |
| (b) Dowex 50—2% crosslinking. | Dowex 1—2% crosslinking 10 mm. thick. |
| (c) Dowex 50—2% crosslinking or Alumino Silicate or Glauconite having an exchange capacity of approximately .18 milliequivalents/gram. | Alumina, heavy metal silicates of an exchange capacity approximately .05 to .15 milliequivalents per gram 20 mm. thick: or Silica Gel 20 mm. thick with a biasing layer of IRA-400 of a thickness equal to the total thickness of all other membranes. |

What is claimed is:

1. A multi-compartment apparatus for the treatment of fluids, including liquids and gases, the apparatus comprising, a housing; a plurality of spaced membranes subdividing said housing into a plurality of chambers including two spaced electrolyte chambers and intermediate treatment chambers between said electrolyte chambers, said membranes being permeable to ions of at least one polarity; electrodes in said electrolyte chambers; a fluid permeable porous filler of ion exchange material in at least two adjacent treatment chambers, said filler being in contact with, and forming an ion conductive bridge between, the bordering membranes of said last named treatment chambers and having an ion-of-said-one-polarity-to-solvent transfer ratio of a different magnitude than the bordering membranes; and means for passing fluid to be treated through said filler, said means including spaced outlets from said filler containing chambers, said outlets being arranged to withdraw fluid from zones spaced in the direction of flow of electric current through the apparatus.

2. A multi-compartment apparatus for the treatment of fluids, including liquids and gases, the apparatus comprising, a housing; a plurality of spaced membranes subdividing said housing into a plurality of chambers including two spaced electrolyte chambers and intermediate treatment chambers between said electrolyte chambers, said membranes being permeable to ions of at least one polarity; electrodes in said electrolyte chambers; a fluid permeable porous filler of ion exchange material in at least two adjacent treatment chambers, said filler being in contact with, and forming an ion conductive bridge between, the bordering membranes of said last named treatment chambers and having an ion-of-said-one-polarity-to-solvent transfer ratio smaller than the bordering membranes; and means for passing fluid to be treated through said filler, said means including spaced outlets from said filler containing chambers, said outlets being arranged to withdraw fluid from zones spaced in the direction of flow of electric current through the apparatus.

3. A multi-compartment apparatus for the treatment of fluids, including liquids and gases, the apparatus comprising, a housing, a plurality of spaced membranes subdividing said housing into a plurality of chambers including two spaced electrolyte chambers and intermediate treatment chambers between said electrolyte chambers; electrodes in said electrolyte chambers; a fluid permeable porous filler of ion exchange material in at least two adjacent treatment chambers, said filler and said membranes constituting elements at least one of which is permselective in the sense of being more permeable to ions of one polarity than to ions of the opposite polarity said filler having a certain ionic conductivity for ions of at least said one polarity and a certain ion-of-said-one-polarity-to-liquid transfer ratio for the liquid to be treated, said membranes and filler in entirety being more permeable to ions of said one polarity than to ions of the opposite polarity, the ion-to-liquid transfer ratio of the membranes being of a different magnitude than that of the filler, said filler being in contact with, and forming a conductive bridge between, the bordering membranes of said adjacent treatment chambers; and means for passing fluid through said filler, said means including spaced outlets from said filler containing chamber, said outlets being arranged to withdraw fluid from zones spaced in the direction of flow of electric current through the apparatus.

4. A multi-compartment apparatus for the treatment of fluids, including liquids and gases, the apparatus comprising, a housing, a plurality of spaced membranes subdividing said housing into a plurality of chambers, including two spaced electrolyte chambers and intermediate treatment chambers between said electrolyte chambers, at least certain of said membranes being permselective in the sense of being more permeable to ions of one polarity than to ions of the opposite polarity; electrodes in said electrolyte chambers; a fluid permeable porous filler of ion exchange material in at least two adjacent treatment chambers, said filler being in contact with, and forming a conductive bridge between, the bordering membranes of said last-named treatment chambers, said filler having an ion-of-said-one-polarity-to-liquid transfer ratio of a different magnitude than the said bordering membranes; and means for passing fluid to be treated through said filler, said means including outlets arranged to withdraw fluid from zones spaced in the direction of flow of electric current through the apparatus.

5. A multi-compartment apparatus for the treatment of fluids, including liquids and gases, the apparatus comprising, a housing; a plurality of spaced main membranes subdividing said housing into a plurality of chambers including two spaced electrolyte chambers and intermediate treatment chambers between said electrolyte chambers, said main membranes being permeable to ions of at least one polarity; electrodes in said electrolyte chambers; a fluid permeable porous filler of ion exchange material in at least two adjacent treatment chambers, said filler being in contact with, and forming an ion conductive bridge between, the bordering main membranes of said last named treatment chambers and having an ion-of-said-one-polarity-to-solvent transfer ratio of a different magnitude than the bordering main membranes; means for passing fluid to be treated through said filler, said means including spaced outlets from said filler containing chambers, said outlets being arranged to withdraw fluid from zones spaced in the direction of flow of electric current through the apparatus; and subdividing membranes in filler containing chambers so arranged as to form subdividing walls between spaced outlets of the same chamber, said subdividing membranes having an ion-to-liquid-transfer ratio less than that of said main membranes.

6. An apparatus as set forth in claim 5 in which the subdividing membranes consist of ion exchange material.

7. A multi-compartment apparatus for the treatment of fluids, including liquids and gases, the apparatus comprising, a housing, a plurality of spaced main membranes subdividing said housing into a plurality of chambers, including two spaced electrolyte chambers and intermediate treatment chambers between said electrolyte chambers, at least certain of said main membranes being permselective in the sense of being more permeable to ions of one polarity than to ions of the opposite polarity; electrodes in said electrolyte chambers; a fluid permeable porous filler of ion exchange material in at least two adjacent treatment chambers, said filler being in contact with, and forming a conductive bridge between, the bordering main membranes of said last-named treatment chambers, said filler having an ion-of-said-one-polarity-to-liquid transfer ratio of a different magnitude than the said bordering main membranes; means for passing fluid to be treated through said filler, said means including outlets arranged to withdraw fluid from zones spaced in the direction of flow of electric current through the apparatus; and subdividing membranes in filler containing chambers so arranged as to form subdividing walls between spaced outlets of the same chamber, said subdividing membranes having an ion-to-liquid-transfer ratio less than that of said main membranes.

8. An apparatus as set forth in claim 7 in which the subdividing membranes consist of ion exchange material.

9. A multi-compartment apparatus for the treatment of fluids, including liquids and gases, the apparatus comprising, a housing, a plurality of spaced main membranes subdividing said housing into a plurality of chambers, including two spaced electrolyte chambers and intermediate treatment chambers between said electrolyte chambers, at least certain of said main membranes being permselective in the sense of being more pearmeable to ions of one polarity than to ions of the opposite polarity; electrodes in said electrolyte chambers; a fluid permeable porous filler of ion exchange material in at least two adjacent treatment chambers, said filler being in contact with, and forming a conductive bridge between, the bordering main membranes of said last-named treatment chambers, said filler being permeable to ions of said one polarity and having a certain ion-of-said-one-polarity-to-liquid transfer ratio for the fluid to be treated, the ion-to-liquid transfer ratio of the main membranes being of a different magnitude than that of the filler; means for passing fluid to be treated through said filler, said means including outlets spaced in the direction of flow of electric current through the apparatus; and subdividing membranes in filler containing chambers so arranged as to form subdividing walls between spaced outlets of the same chamber, at least one of said subdividing membranes being more passage resistant to ions of said one polarity than to ions of the opposite polarity.

10. A multi-compartment apparatus for the treatment of fluids, including liquids and gases, the apparatus comprising, a housing, a plurality of spaced main membranes subdividing said housing into a plurality of chambers, including two spaced electrolyte chambers and intermediate treatment chambers between said electrolyte chambers, at least certain of said main membranes being permselective in the sense of being more permeable to ions of one polarity than to ions of the opposite polarity; electrodes in said electrolyte chambers; a fluid permeable porous filler of amphoteric ion exchange material in at least two adjacent treatment chambers, said filler being in contact with, and forming a conductive bridge between, the bordering main membranes of said last-named treatment chambers, said filler being permeable to ions of said one polarity and having a certain ion-of-said-one-polarity-to-liquid transfer ratio for the fluid to be treated, the ion-to-liquid transfer ratio of the main membranes being of a different magniture than that of the filler; means for passing fluid to be treated through said filler, said means including outlets spaced in the direction of flow of electric current through the apparatus; and subdividing membranes in filler containing chambers so arranged as to form subdividing walls between spaced outlets of the same chamber, at least one of said subdividing membranes being more passage resistant to ions of said one polarity than to ions of the opposite polarity.

11. A multi-compartment apparatus for the treatment of fluids, including liquids and gases, the apparatus comprising, a housing, a plurality of spaced main membranes subdividing said housing into a plurality of chambers, including two spaced electrolyte chambers and intermediate treatment chambers between said electrolyte chambers, at least certain of said main membranes being permselective in the sense of being more permeable to ions of one polarity than to ions of the opposite polarity; electrodes in said electrolyte chambers; a fluid permeable porous filler of ion exchange material in at least two adjacent treatment chambers, said filler being in contact with, and forming a conductive bridge between, the bordering main membranes of said last-named treatment chambers, said filler being permeable to ions of said one polarity and having a certain ion-of-said-one-polarity-to-liquid transfer ratio for the fluid to be treated, the ion-to-liquid transfer ratio of the main membranes being of a different magnitude than that of the filler; means for passing fluid to be treated through said filler, said means including outlets spaced in the direction of flow of electric current through the apparatus; and subdividing membranes of ion exchange material in filler containing chambers so arranged as to form subdividing walls between spaced outlets of the same chamber at least one of said subdividing membranes being more passage resistance to ions of said one polarity than to ions of the opposite polarity.

12. A multi-compartment apparatus for the treatment of fluids, including liquids and gases, the apparatus comprising, a housing, a plurality of spaced main membranes subdividing said housing into a plurality of chambers, including two spaced electrolyte chambers and intermediate treatment chambers between said electrolyte chambers, at least certain of said main membranes being permselective in the sense of being more permeable to ions of one polarity than to ions of the opposite polarity; electrodes in said electrolyte chambers; a fluid permeable porous filler of amphoteric ion exchange material in at least two adjacent treatment chambers, said filler being in contact with, and forming a conductive bridge between, the bordering main membranes of said last-named treatment chambers, said filler being permeable to ions of said one polarity and having a certain ion-of-said-one-polarity-to-liquid transfer ratio for the fluid to be treated, the ion-to-liquid transfer ratio of the main membranes being of a different magnitude than that of the filler; means for passing fluid to be treated through said filler, said means including outlets spaced in the direction of flow of electric current through the apparatus; and subdividing membranes of ion exchange material in filler containing chambers so arranged as to form subdividing walls between spaced outlets of the same chamber at least one of said subdividing membranes being more passage resistant to ions of said one polarity than to ions of the opposite polarity.

13. A multi-compartment apparatus for the treatment of fluids, including liquids and gases, the apparatus comprising, a housing; a plurality of spaced membranes subdividing said housing into a plurality of chambers including two spaced electrolyte chambers and intermediate treatment chambers between said electrolyte chambers, said membranes being permeable to ions of at least one polarity; electrodes in said electrolyte chambers; a fluid permeable porous filler of ion exchange material in all of the intermediate treatment chambers, said filler being in contact with, and forming an ion conductive bridge between, said membranes and having an ion-of-said-one-polarity-to-solvent transfer ratio of a different magnitude than the said membranes; and means for passing fluid to be treated through said filler, said means including spaced outlets from said intermediate treatment chambers, said outlets being arranged to withdraw fluid from zones spaced in the direction of flow of electric current through the apparatus.

14. An apparatus for the treatment of fluids including liquids, vapors, and gases, the apparatus comprising, a plurality of chambers arranged side by side; fluid separating membranes between said chambers, at least certain of said membranes being more permeable to ions of one polarity than to ions of the opposite polarity; electrodes in certain spaced chambers for applying an electrical potential across said membranes, chambers, and the fluid therein; a fluid permeable porous filler of ion exchange material in at least certain of said chambers, said filler being in contact with, and forming an ion conductive bridge between, the bordering membranes of the respective chambers; and means for passing fluid to be treated through said filler, said means including outlets from said filler containing chambers, said outlets being arranged to withdraw fluid from zones spaced in the direction of flow of electric current through the apparatus.

15. An apparatus as set forth in claim 14 in which the filler consists of an ion exchange material of an elastic nature, said filler being elastically compressed for enlarged contact between its particles.

16. An apparatus for the treatment of fluids including liquids, vapors, and gases, the apparatus comprising, a plurality of chambers arranged side by side; fluid separating membranes between said chambers, at least certain of said membranes being more permeable to ions of one polarity than to ions of the opposite polarity; electrodes in certain spaced chambers for applying an electrical potential across said membranes, chambers, and the fluid therein; a fluid permeable porous filler in at least certain of said chambers, said filler consisting of particles of ion exchange material of at least one polarity, said particles being in contact with one another and with the bordering membranes of the respective chambers and forming an ion conductive bridge between membranes; and means for passing fluid to be treated through said filler, said means including outlets from said filler containing chambers, said outlets being arranged to withdraw fluid from zones spaced in the direction of flow of electric current through the apparatus.

17. An apparatus for the treatment of fluids including liquids, vapors, and gases, the apparatus comprising, a plurality of chambers arranged side by side; fluid separating membranes between said chambers, alternating membranes being anion permeable and cation passage resistant, membranes between said alternating membranes being cation permeable and anion passage resistant; electrodes in certain spaced chambers for applying an electrical potential across said membranes, chambers, and the fluid therein; a fluid permeable porous filler of ion exchange material in at least certain of said chambers, said filler being in contact with, and forming an ion conductive bridge between, the bordering membranes of the respective chambers; and means for passing fluid to be treated through said filler, said means including outlets from said filler containing chambers, said outlets being arranged to withdraw fluid from zones spaced in the direction of flow of electric current through the apparatus.

18. In a process for the continuous fractionation by electrodialysis of electrically conductive and electrically non-conductive fluids in a multi-chamber apparatus comprising, electrode chambers containing an electrolyte, and intermediate treatment chambers separated from the electrode chambers, and from one another, by permselective membranes, the steps of introducing the fluid to be treated into the interstices of an ion conductive filler occupying the space between the bordering membranes of adjoining chambers; driving ions originating in an electrolyte external with respect to said filler into and through said filler, the filler having an ion-to-solvent transfer ratio for the driving ions different from the ion-to-solvent transfer ratio for the same ions of at least one of the bordering membranes, and withdrawing the fractions from the filler containing chamber from zones spaced in the direction of the flow of electric current through the apparatus.

19. In a process for the continuous fractionation by electrodialysis of electrically conductive and electrically non-conductive fluid mixtures in a multi-chamber apparatus comprising electrolyte chambers containing electrodes and intermediate treatment chambers separated from the electrolyte chambers and from one another, by permselective membranes, the steps of introducing the fluid to be treated into the interstices of an ion conductive filler occupying the space between two membranes; driving ions of a certain polarity and originating in the electrolyte of one electrode chamber through membranes and filler, the electrolyte yielding the driving ions being so selected that the driving ions adsorb one of the components of the mixture more readily than another, said filler having an ion-to-solvent transfer ratio for said driving ions different from the ion-to-solvent transfer ratio for the same ions of at least one of said two bordering membranes, whereby concentration and dilution zones are formed at points spaced in the direction of passage of current through the apparatus; and withdrawing the components from said zones.

20. A process according to claim 19 in which, in addition, the electrolyte in the electrode chambers is circulated so as to pass from one electrode chamber to the other electrode chamber and then back to said one chamber.

21. A process according to claim 18 in which, in addition, the concentration of the electrolyte is of the order of 0.5 N and higher and in which membranes are employed which, by reason of their polarity, are passage resistant to the driving ions, whereby leakage operation is obtained in which the solvent shells of the driving ions are particularly small.

22. An apparatus for the continuous fractionation of fluids, including liquids and gases, the apparatus comprising, a first electrode chamber, a second electrode chamber spaced from said first electrode chamber; electrodes in said electrode chambers; at least one treatment chamber between said electrode chambers; fluid separating membranes between said chambers, at least certain of said membranes being more permeable to ions of one polarity than to ions of the opposite polarity; a fluid permeable porous filler of ion exchange material in said treatment chamber, said filler being in contact with, and forming an ion conductive bridge between, the bordering membranes of the treatment chamber; and means for passing fluid to be treated through said filler, said means including outlets from said treatment chamber, said outlets being arranged to withdraw fluid from zones spaced in the direction of flow of current from one of said electrodes to the other.

23. An apparatus as set forth in the preceding claim 22 in which the filler has an ion-to-solvent transfer ratio of ions of a certain polarity different from the ion-to-solvent transfer ratio for the same ions of at least one of the bordering membranes of the treatment chamber.

24. In a process for the continuous fractionation by electrodialysis of electrically conductive and electrically non-conductive fluid mixtures into their components in a multi-chamber apparatus comprising electrode chambers containing electrodes and treatment chambers between said electrode chambers separated from the electrode chambers and from one another, by permselective membranes, the steps of introducing the fluid to be treated into the interstices of an ion conductive filler occupying the space between two membranes; driving ions of a certain polarity originating in an electrolyte liquid other than the fluid to be treated through membranes and filler, said electrolyte liquid being so selected that the driving ions adsorb one of the components of the mixture more readily than another, the filler having an ion-to-solvent transfer ratio for the driving ions different from the ion-to-solvent transfer ratio for the same ions of at least one of the bordering membranes, whereby concentration and dilution zones are formed spaced in the direction of passage of current through the apparatus; and withdrawing the components from said zones.

25. In a process for the continuous fractionation by electrodialysis of electrically conductive and electrically non-conductive fluid mixtures into their components in a multi-chamber apparatus comprising electrolyte chambers containing electrodes and treatment chambers between the electrode chambers separated from the electrode chamber and from one another by permselective membranes, the steps of introducing the fluid to be treated into the interstices of an ion conductive amphoteric filler of ion exchange material occupying the space between two bordering membranes; driving ions of a certain polarity originating in an electrolyte liquid other than the fluid to be treated through membranes and filler, said electrolyte liquid being so selected that the driving ions adsorb one of the components of the mixture more readily than another, the filler having an ion-to-solvent transfer ratio for the driving ions different from the ion-to-solvent transfer ratio for the same ions of at least one of the bordering membranes, controlling the flow of ions by membranes permeable to the driving ions and passage resistant to ions of the opposite polarity, whereby concentration and dilution zones are formed spaced in the direction of passage of current through the apparatus, and withdrawing the components from said zones.

26. In a process for the continuous fractionation by electrodialysis of electrically conductive and electrically non-conductive fluid mixtures into their components in a multi-chamber apparatus comprising electrolyte chambers containing electrode and treatment chambers between the electrode chambers separated from the electrode chamber and from one another by permselective membranes, the steps of introducing the fluid to be treated into the interstices of an ion conductive filler of ion exchange material occupying the space between two bordering membranes; driving ions of a certain polarity originating in an electrolyte liquid other than the fluid to be treated through membranes and filler, said electrolyte liquid being so selected that the driving ions adsorb one of the components of the mixture more readily than another, the filler having an ion-to-solvent transfer ratio for the driving ions different from the ion-to-solvent transfer ratio for the same ions of at least one of the bordering membranes, controlling the flow of ions by membranes passage resistant to the driving ions and permeable to ions of the opposite polarity, whereby concentration and dilution zones are formed spaced in the direction of passage of current through the apparatus, and withdrawing the components from said zones.

27. An apparatus for the treatment of liquids by ion transfer under the influence of an electric current, the apparatus comprising a housing; spaced ion permeable membranes in said housing for subdividing said housing into individual chambers in such a way that an intermediate chamber lies between two chambers into which ions are transferred from said intermediate chamber through its bordering membranes, there being two spaced electrolyte chambers between which said intermediate chamber lies; a fluid permeable porous filler of amphoteric ion exchange material in said intermediate chamber, said filler forming a conductive bridge for ions of both polarities between the bordering membranes of said intermediate chamber; means for continuously supplying liquid to be treated into said filler-containing chamber; means for continuously removing liquid from said filler-containing chamber after passage through said filler; means for supplying liquid into the two adjacent chambers between which said intermediate chamber lies; means for withdrawing liquid from said two adjacent chambers; and electrodes in said electrolyte chambers.

28. An apparatus for the treatment of liquids by ion transfer under the influence of an electric current, the apparatus comprising a housing; spaced ion permeable membranes of two types arranged in said housing in alternating sequence, one type being of ion exchange material selectively permeable to ions of one polarity, the other type being of a material permeable to ions of the opposite polarity, said membranes subdividing said housing into individual chambers in such a way that an intermediate chamber lies between two chambers into which ions are transferred from said intermediate chamber through its bordering membranes, there being two electrolyte chambers between which said intermediate chamber lies; a fluid permeable porous filler of ion exchange material in said intermediate chamber, said filler forming an ion conductive bridge between the bordering membranes of said intermediate chamber; means for continuously supplying liquid to be treated into said filler-containing chamber; means for continuously removing treated liquid from said filler-containing chamber after passage through said filler; means for supplying liquid into the two chambers between which said intermediate chamber lies; means for withdrawing liquid from said two adjacent chambers; and electrodes in said electrolyte chambers, the electrode lying on the side of the filler bordered by the membrane selectively permeable to ions of said one polarity being an electrode of said opposite polarity, the other electrode being of said one polarity.

29. An apparatus for the treatment of fluids including liquids and gases by ion transfer under the influence of an electric current, the apparatus comprising a housing; spaced ion permeable membranes of two types arranged in said housing in alternating sequence, one type being of ion exchange material selectively permeable to ions of one polarity, the other type being of a material permeable to ions of the opposite polarity, said membranes subdividing said housing into individual chambers in such a way that an intermediate chamber lies between two chambers into which ions are transferred from said intermediate chamber through its bordering membranes, there being two electrolyte chambers between which said intermediate chamber lies; a fluid permeable filler of ion exchange material of one polarity permeable, in a substantial degree, to ions of both polarities, said filler being in said intermediate chamber and forming an ion conductive bridge between the bordering membranes of said intermediate chamber and having an ion-of-said-one-polarity-to-solvent transfer ratio smaller than at least one of the two bordering membranes; means for supplying fluid to be treated into said intermediate chamber, means for removing treated fluid from said filler-containing chamber; means for supplying fluid into the two chambers between which said filler-containing chamber lies; means for withdrawing fluid from said two adjacent chambers; and electrodes in said electrolyte chambers, the electrode lying on the side of the filler bordered by a membrane selectively permeable to ions of a certain polarity being an electrode of opposite polarity, the other electrode being of said certain polarity.

30. An apparatus for the treatment of fluids including liquids and gases by ion transfer under the influence of an electric current, the apparatus comprising a housing; spaced ion permeable membranes of two types arranged in said housing in alternating sequence, one type being of ion exchange material selectively permeable to ions of one polarity, the other type being of a material permeable to ions of the opposite polarity, said membranes subdividing said housing into individual chambers in such a way that an intermediate chamber lies between two chambers into which ions are transferred from said intermediate chamber through its bordering membranes, there being two electrolyte chambers between which said intermediate chamber lies; a fluid permeable porous filler comprising a mixture of ion exchange materials of two types, one type being conductive to cations in preference to anions, the other type being conductive to anions in preference to cations, said filler forming an ion conductive bridge between the bordering membranes of said intermediate chamber; means for continuously supplying fluid to be treated into said filler-containing chamber; means for continuously removing fluid from said filler-containing chamber after passage through said filler; means for supplying fluid into the two chambers between which said intermediate chamber lies; means for withdrawing fluid from said two adjacent chambers; and electrodes in said electrolyte chambers, the electrode lying on the side of the filler bordered by a membrane selectively permeable to ions of a certain polarity being an electrode of opposite polarity, the other electrode being of said certain polarity.

31. An apparatus for the treatment of fluids including liquids and gases by ion transfer under the influence of an electric current, the apparatus comprising a housing; spaced ion permeable membranes of two types arranged in said housing in alternating sequence, one type being of ion exchange material selectively permeable to ions of one polarity, the other type being of a material permeable to ions of the opposite polarity, said membranes subdividing said housing into individual chambers in such a way that an intermediate chamber lies between two chambers into which ions are transferred from said intermediate chamber through its bordering membranes, there being two electrolyte chambers between which said intermediate chamber lies; a fluid permeable porous filler comprising a mixture of ion exchange materials of two types, one type being conductive to cations in preference to anions, the other type being conductive to anions, at least one of the ion exchange materials being taken from the group known as strong acid type and strong base type of ion exchangers, said filler forming an ion conductive bridge between the bordering membranes of said intermediate chamber; means for continuously supplying fluid to be treated into said filler-containing chamber; means for continuously removing fluid from said filler-containing chamber after passage through said filler; means for supplying fluid into the two chambers between which said intermediate chamber lies; means for withdrawing fluid from said two adjacent chambers; and electrodes in said electrolyte chambers, the electrode lying on the side of the filler bordered by a membrane selectively permeable to ions of a certain polarity being an electrode of opposite polarity, the other electrode being of said certain polarity.

32. An apparatus for the treatment of fluids including liquids and gases by ion transfer under the influence of an electric current, the apparatus comprising a housing; spaced ion permeable membranes of two types arranged in said housing in alternating sequence, one type being of ion exchange material selectively permeable to ions of one polarity, the other type being of a material permeable to ions of the opposite polarity, said membranes subdividing said housing into individual chambers in such a way that an intermediate chamber lies between two chambers into which ions are transferred from said intermediate chamber through its bordering membranes, there being two electrolyte chambers between which said intermediate chamber lies; a fluid permeable porous filler comprising a mixture of two ion exchange materials of two types, one type being conductive to cations in preference to anions, the other type being conductive to anions, both of the ion exchange materials being taken from the group known as strong acid type and strong base type of ion exchangers, said filler forming an ion conductive bridge between the bordering membranes of said intermediate chamber; means for continuously supplying fluid to be treated into said filler-containing chamber; means for continuously removing fluid from said filler-containing chamber after passage through said filler; means for supplying fluid into the two chambers between which said intermediate chamber lies; means for withdrawing fluid from said two adjacent chambers; and electrodes in said electrolyte chambers, the electrode lying on the side of the filler bordered by a membrane selectively permeable to ions of a certain polarity being an electrode of opposite polarity, the other electrode being of said certain polarity.

33. In a process for the continuous fractionation by electrodialysis of electrically conductive and electrically non-conductive fluids in a multi-chamber apparatus comprising, electrode chambers containing an electrolyte, and intermediate treatment chambers separated from the electrode chambers, and from one another, by permselective membranes, the steps of introducing the fluid to be treated into the interstices of an ion conductive filler occupying the space between the bordering membranes of adjoining chambers; driving ions originating in an electrolyte external with respect to the filler into and through said filler, the filler having an ion-to-solvent transfer ratio for the driving ions less than the ion-to-solvent transfer ratio for the same ions of at least one of the bordering membranes; and withdrawing the fractions from the filler-containing chamber from zones spaced in the direction of flow of electric current through the apparatus.

34. A process for the continuous treatment of liquids containing a plurality of components, the process comprising the steps of subjecting a macroporous body of ion exchange material to the action of an electrical direct potential applied across said body under conditions under which an electric current flows through said body as a result of ion movement through said body; introducing a flow of said liquid into said body; controlling the flow of ions induced by said potential by membranes of two types interposed into said path of ions, one type being selectively permeable to ions of one polarity, the other type being of a material permeable to ions of the opposite polarity, at least one of the membranes having an ion-to-solvent transfer ratio for ions of a certain polarity different from the ion-to-solvent transfer ratio of said body for ions of said certain polarity, the control being such as to restrict the flow of ions into the body to a greater extent than from the body; and withdrawing liquid from said body at a point so selected that the direction of liquid flow is substantially transverse to the direction of the electric current.

35. A process for the continuous treatment of liquids containing a plurality of components, the process comprising the steps of subjecting a macroporous body of ion exchange material to the action of an electrical direct potential applied across said body under conditions under which an electric current flows through said body as a result of ion movement through said body, said body being conductive to anions and cations; introducing a flow of said liquid into said body; controlling the flow of ions induced by said potential by membranes of two types interposed into said path of ions, one type being selectively permeable to ions of one polarity, the other type being of a material permeable to ions of the opposite polarity, the control being such as to restrict the flow of ions into the body to a greater extent than from the body; and withdrawing liquid from said body at a point so selected that the direction of liquid flow is substantially transverse to the direction of the electric current.

36. An apparatus for the treatment of fluids, particularly for the fractionation of ionic constituents of the same polarity, the apparatus comprising a plurality of chambers arranged side by side; fluid separating membranes between said chambers, said membranes being selectively permeable for ions of one polarity; electrodes in certain spaced chambers for applying an electrical potential across said membranes, chambers and the fluid therein; a fluid permeable porous filler of ion exchange material conductive for ions of the opposite polarity, said filler being in a treatment chamber intermediate the electrode containing chambers, said filler forming an ion conducting bridge between the bordering membranes of said last named treatment chamber; means for passing fluid to be treated through said filler in a direction substantially normal to the direction of the current flowing from one electrode to the other, said means including outlets for separate withdrawal of fluid from zones spaced in the direction of flow of the electric current through the apparatus.

37. An apparatus for the treatment of fluids, particularly for the fractionation of ionic constituents of the same polarity, the apparatus comprising a plurality of chambers arranged side by side; fluid separating membranes between said chambers, said membranes being selectively permeable for ions of one polarity; electrodes in certain spaced chambers for applying an electrical potential across said membranes, chambers and the fluid therein; a fluid permeable porous filler of amphoteric ion exchange material, said filler being in a treatment chamber intermediate the electrode containing chambers, said filler forming an ion conductive bridge between the bordering membranes of said last named treatment chamber; means for passing fluid to be treated through said filler in a direction substantially normal to the direction of the current flowing from one electrode to the other, said means including outlets for separate withdrawal of fluid from zones spaced in the direction of flow of the electric current through the apparatus.

38. An apparatus for the treatment of fluids, particularly for the fractionation of ionic constituents of the same polarity, the apparatus comprising a plurality of chambers arranged side by side; fluid separating membranes between said chambers, said membranes being selectively permeable for ions of one polarity; electrodes in certain spaced chambers for applying an electrical potential across said membranes, chambers and the fluid therein; a fluid permeable porous filler of ion exchange material conductive for ions of the opposite polarity, said filler being in a treatment chamber intermediate the electrode containing chambers, said filler forming an ion conductive bridge between the bordering membranes of said last named treatment chambers; subdividing membranes in said treatment chambers, said subdividing membranes being of a material permeable to ions conducted by said filler and subdividing said chambers into zones disposed substantially parallel to, and at different distances from, said first named fluid separating membranes; means for passing fluid to be treated through said filler in a direction substantially normal to the direction of the current flowing from one electrode to the other; said means including outlets for separate withdrawal of fluid from said zones.

39. An apparatus for the treatment of fluids, particularly for the fractionation of ionic constituents of the same polarity, the apparatus comprising a plurality of chambers arranged side by side; fluid separating membranes between said chambers, said membranes being selectively permeable for ions of one polarity; electrodes in certain spaced chambers for applying an electrical potential across said membranes, chambers and the fluid therein; a fluid permeable porous filler of ion exchange material conductive for ions of the opposite polarity, said filler being in a treatment chamber intermediate the electrode containing chambers, said filler forming an ion conductive bridge between the bordering membranes of said last named treatment chambers; subdividing membranes in said treatment chambers, said subdividing membranes being of an ion exchange material conductive for ions conducted by said filler and subdividing said chambers into zones disposed substantially parallel to, and at different distances from, said first named fluid separating membranes; means for passing fluid to be treated through said filler in a direction substantially normal to the direction of the current flowing from one electrode to the other, said means including outlets for separate withdrawal of fluid from said zones.

References Cited in the file of this patent

UNITED STATES PATENTS

| 1,878,235 | Gortner et al. | Sept. 20, 1932 |
| 2,057,232 | Endell | Oct. 13, 1936 |
| 2,708,658 | Rosenberg | May 17, 1955 |

FOREIGN PATENTS

| 491,073 | Belgium | Sept. 12, 1949 |
| 675,253 | Great Britain | July 9, 1952 |

OTHER REFERENCES

Walters et al.: Industrial and Engineering Chemistry, January 1955, vol. 47, No. 1, pp. 61–66.

U. S. DEPARTMENT OF COMMERCE
PATENT OFFICE

CERTIFICATE OF CORRECTION

Patent No. 2,815,320

December 3, 1957

Paul Kollsman

It is hereby certified that error appears in the printed specification of the above numbered patent requiring correction and that the said Letters Patent should read as corrected below.

Column 2, line 21, for "ions such" read -- ions in such --; column 4, line 26, for "iron" read -- ion --; column 8, line 75, for "foregiven" read -- aforegiven --; column 11, line 26, for "thruogh" read -- through --; column 15, line 62, for "outlet No. 1--.77 cc." read -- outlet No. 1--.7 cc. --; column 16, line 38, for "MaCl" read -- NaCl --.

Signed and sealed this 6th day of May 1958.

(SEAL)
Attest:
KARL H. AXLINE
Attesting Officer

ROBERT C. WATSON
Commissioner of Patents